Jan. 24, 1967   B. W. TARABA   3,300,690
MATERIAL LEVEL DETECTION DEVICE
Filed Dec. 6, 1963
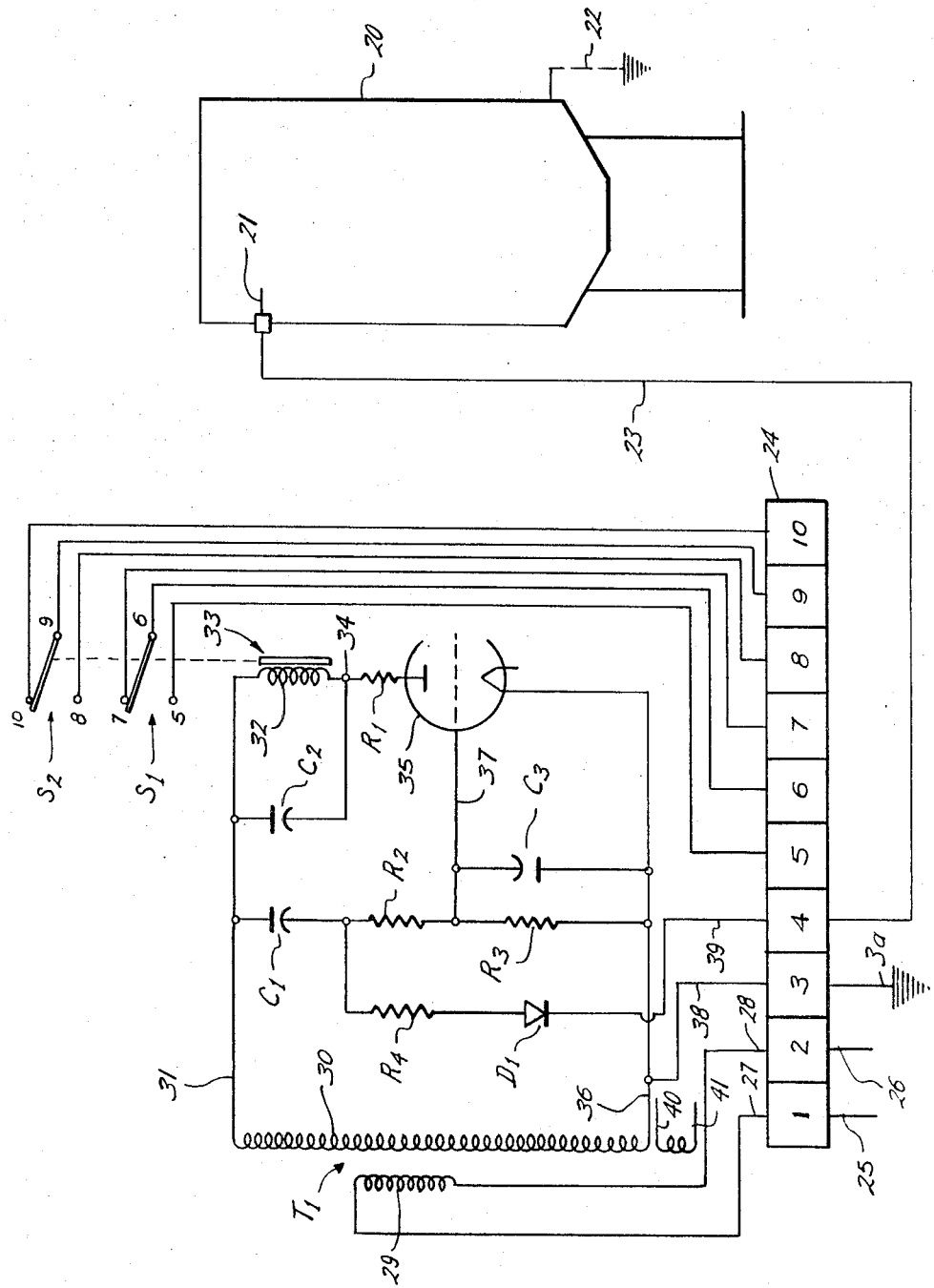
Bueford W. Taraba
INVENTOR.
BY J. Vincent Martin
Joe E. Edwards
M. H. Gray
ATTORNEYS

United States Patent Office 3,300,690
Patented Jan. 24, 1967

3,300,690
MATERIAL LEVEL DETECTION DEVICE
Bueford W. Taraba, Tucson, Ariz., assignor to Duval Corporation, Houston, Tex., a corporation of Texas
Filed Dec. 6, 1963, Ser. No. 328,690
4 Claims. (Cl. 317—149)

The present invention relates to a device for the detection of the level of a solid or a liquid and for providing an indication and other means responsive to such level detection.

Prior to the present invention the detection of the level of a liquid or solid by means of resistance probes has been limited to materials having a relatively low electrical resistance. Such resistance type level detectors have heretofore relied upon the conductivity of the measured material to pass sufficient current to actuate a relay. When such devices are used on materials having high electrical resistances, the voltage potential that must be applied to the probe in order to develop sufficient current to actuate a relay becomes prohibitively high, resulting in a safety hazard as well as extra maintenance normally required for high voltage power sources.

Level detection is also accomplished using the capacitance type probe, an electronic device that senses the presence or absence of the material being measured by resultant changes in the capacitance of the probe. However, when materials being measured vary in their dielectric characteristics the capacitance type level detector becomes unreliable and sometimes completely inactive.

This invention provides an improved means of detecting the levels of materials, either liquids or solids, and depends solely upon the electrical conductivity of the measured material, the electrical, resistance of which may vary over a range from zero to 200,000,000 ohms. This level detection unit does not require a high voltage circuit with the accompanying hazard to personnel and high maintenance expense.

It is an object of the present invention to provide an improved device which will detect the level of a solid or a liquid.

A further object of the present invention is to provide an improved combination of a probe and a circuit connecting to said probe whereby said combination will indicate when the level of material builds up to a height at which it engages said probe.

A still further object of the present invention is to provide a simple probe and electric circuit to detect and indicate the level of a solid or liquid.

Another object of the present invention is to provide a probe and an electric circuit to indicate the level of solids or liquids which utilizes a readily available source of alternating current.

Still another object of the present invention is to provide an electric level detecting device which actuates switches whereby indication and control of the level of material is provided.

These and other objects of the present invention are more clearly explained and described in relation to the drawing wherein:

The figure is a schematic wiring diagram of the circuit of the present invention and schematically illustrates the probe and its connection into a container holding the material whose level is to be detected.

Referring to the drawing a container or tank 20 is shown schematically as representing any container in which a liquid or solid is to be contained and an indication of the level of the liquid or solid contained therein is desired. Probe 21 extends into the interior of tank 20 at a predetermined height which may be the level at which the material in tank 20 is to be maintained or simply the level at which an indication of level is desired. The height of probe 21 in tank 20 also could be the maximum or minimum height which the level of material should attain within tank 20 and can be used to indicate and control this level in accordance with this invention. Normally tank 20 will be provided with means for filling and discharging material, such apparatus although not shown in the drawing may be of any form which is normally used for this purpose and may be used to control the level of material in tank 20. As shown tank 20 is suitably grounded as at 22. Probe 21 should be insulated from the wall of tank 20 to prevent the direct flow of electric current therebetween.

Lead 23 which connects from probe 21 to position 4 on terminal board 24 forms a part of the probe circuit with tank 20 and its ground connection 22. Terminal board 24 is provided with ten positions, numbered 1 through 10 inclusive on the drawing. Leads 25 and 26 connect into positions 1 and 2 of terminal board 24 from a suitable source (not shown) of alternating current having a potential of approximately 115 volts. Position 3 is grounded as at 3a. The remaining positions of terminal board 24 are not shown to have any external connections on the drawing but the use for such positions is hereinafter more fully explained.

The electric power available to positions 1 and 2 of terminal board 24 is connected by leads 27 and 28 to opposite ends of primary winding 29 of transformer T1. One end of secondary winding 30 of transformer T1 is connected by lead 31 to capacitor C1 and through coil 32 of relay 33, terminal 34 and resistance R1 to the plate of triode tube 35. Capacitor C2 is connected in parallel to coil 32 of relay 33 from lead 31 to terminal 34 between coil 32 and resistor R1. The other end of secondary winding 30 is connected by lead 36 to the cathode of tube 35.

An alternating current voltage divider circuit is connected between leads 31 and 36 and comprises capacitor C1, resistor R2 which are connected by lead 37 to the grid of tube 35, and resistor R3 which extends from the connection of lead 37 and resistor R2 to lead 36. Capacitor C3 is connected in parallel to resistor R3 between lead 36 and lead 37.

Lead 36 is connected by lead 38 to position 3 of terminal board 24 to provide a ground connection for secondary winding 30. The probe circuit extends from position 4 of terminal board 24 through lead 39, diode rectifier D1 and resistor R4 into the connection between capacitor C1 and resistor R2.

Relay 33 is operatively connected to switches S1 and S2. Positions 5 through 10 of terminal board 24 are connected to the terminals of switches S1 and S2 as shown for the reasons as hereinafter more fully explained. The remaining portion of secondary winding 30 of transformer T1 is provided with leads 40 and 41 which are spaced to have an output potential of approximately 6 volts. These leads are connected to the filament heater of tube 35.

Following are examples of a circuit constructed in accordance with the present invention and the ratings of the components. It should be understood that the changing of rating of one or more of the components of the circuit may necessitate the change of ratings of other components.

Transformer T1 is a standard transformer and should be designed to provide a potential between leads 31 and 36 of secondary winding 30 of approximately 230 volts when the input potential between leads 27 and 28 in 115 volts. Tube 35 is preferably a 6SN7 twin triode tube in which only one-half of the tube is shown in the figure and used in conjunction with the device of the present invention. The other half of tube 35 may easily be used for another device similar to the device shown but connected to another probe in tank 20 or to a probe in another tank. Often it is advantageous to have a plurality of probes 21 in tank 20 which are positioned at different levels so that an indication will be provided showing the level of the material within tank 20.

Diode rectifier D1 is a CR1 Sarkes Tarzian silicon rectifier. Relay 33 is an advance relay GHE/2C/5000D. Switches S1 and S2 are linked together and are double pole switches actuated by relay 33.

The other components of the circuits have the following ratings: Resistors—R1, 4,700 ohms; R2, 22 megohms; R3, 10 megohms; R4, 22 megohms. Capacitors—C1, 0.01 microfarad; C2, 4.0 microfarad; C3, 0.1 microfarad.

Resistor R1 is selected to have the above rating to limit the current flow through coil 32 to slightly more than 7.2 milliamps which is the current required to actuate relay 33. Resistor R1 could be omitted and the circuit would still function properly, however damage to coil 32 could result from excessive current.

As shown in the figure switches S1 and S2 are in the position they would assume when the circuit is without power. When power is applied to the circuit and the probe is not in contact with material, tube 35 is conducting current, relay 33 will be energized and will actuate switches to the opposite position from that shown in the figure. When probe is contacted by material switch S1 is returned to the position shown in the figure and connects the leads extending to positions 6 and 7 of terminal board 24. The leads (not shown) from positions 6 and 7 of terminal board 24 could be connected to an indicator light showing that the level of material in tank 20 has reached the height of probe 21. In the other position switch S1 will connect the leads connecting to positions 5 and 6 of terminal board 24 which could be connected to an indicator light showing that the level of material in tank 20 has not reached the height of probe 21. The leads from switch S2 connect to positions 8, 9 and 10 of terminal board 24 and could be connected to the filling and/or discharge controls for tank 20 thereby allowing the device to control the level of material within tank 20. As shown in the figure, switch S2 connects the leads extending from positions 9 and 10 of terminal board 24 to complete a circuit to either shut off the filling of tank 20 or to start the emptying of tank 20 since in this position the level in tank 20 has reached the height of probe 21. The positions 8 and 9 of terminal board would be connected to complete a circuit which could start the filling of tank 20 or to discontinue the discharge from tank 20 since in this position of switch S2 the level of material in tank 20 is below probe 21. Such devices and circuitry are well known and may be readily installed with the device of the present invention to respond to the indication of the level of material within tank 20 as determined by probe 21 and the circuit shown in the figure.

In operation, assuming that tank 20 is not filled to the level of probe 21 and that suitable power is supplied by leads 25 and 26, then voltage is applied to the plate of tube 35 through lead 31, coil 32 and resistor R1 from secondary winding 30 of transformer T1. Voltage is also applied to the control grid of tube 35 through the voltage divider circuit of C1, R2 and R3. The capacitance of C3 (in parallel with R3) is large enough to look like a short to the small amount of current that can flow through C1 and R2. Therefore, there is very little voltage drop across the parallel circuit of R3 and C3 so that the grid voltage remains near zero on both positive and negative half cycles of the alternating current. The other end of secondary winding 30 will be connected both to ground and to the cathode of tube 35. On the positive half cycle of the alternating current voltage the plate of tube 35 swings positive and since the grid is near zero potential, tube 35 will conduct current which will flow through resistor R1 and coil 32 thereby energizing relay 33. Capacitor C2 discharges through coil 32 during the negative half cycle of the alternating current keeping relay 33 in the energized position until the plate of tube 35 again becomes positive and causes tube 35 to again conduct current. Relay 33 will remain energized until the level of material rises in tank 20 so that it touches probe 21.

When the material within tank 20 rises to the level of probe 21, the probe circuit will be completed. When the lead 31 end of winding 30 is positive electrons will flow from the lead 31 side of C1 through winding 30, lead 36, lead 38, lead 3a to ground, ground through lead 22, tank 20, material within tank 20, probe 21, lead 23, lead 39, diode D1, resistor R4 and to the R2 side of capacitor C1. This charge on capacitor C1 will discharge through resistors R2, R3, lead 36, winding 30, lead 31, and back to C1 when lead 31 end of winding 30 becomes negative. Capacitor C1 cannot discharge back through resistor R4 and diode D1 because diode D1 is a rectifier and offers very high impedance to electron flow in the reverse direction. The electron flow through resistor R3 makes the control grid enough negative with respect to the cathode of tube 35 to cut off or considerably limit the electron flow through tube 35. Capacitor C3 now acts as a filter for this rectified portion of current flowing through R3. This keeps the control grid voltage negative with respect to the cathode during both negative and positive half cycles of the alternating current voltage from winding 30 and this negative voltage on the grid is sufficient to render tube 35 nonconducting. When tube 35 is nonconducting, coil 32 will no longer be energized and relay 33 will be deenergized whereby switches S1 and S2 are moved to their opposite positions. The change of switches S1 and S2 may be used as hereinbefore explained to indicate the level of material within tank 20 and to control this level.

When the level of material drops below probe 21, the circuit through the material will be broken and the grid voltage will again return to near zero whereby tube 35 will again be conducting current through coil 32 to energize relay 33.

With the device as described and the probe circuit completed, sufficient current will flow to activate the relay in the detector circuit if the resistance of the material is approximately 200 million ohms or less between tank 20 and probe 21. This current will not be sufficient to create any problem with regard to an individual being shocked by touching tank 20 when current is flowing because of the high resistance rating of resistor R4.

With the circuit shown and described it is necessary to maintain the grid voltage at approximately negative 5 volts or less in order for tube 35 to be conducting when the plate is positive with respect to the cathode. With a negative potential of approximately 12 volts or more on the grid, little or no current will flow through tube 35. In this circuit the capacitance of capacitor C3 should be 0.1 microfarad or larger in order to keep the capacitive reactance low. By keeping the capacitive reactance of capacitor C3 low, the voltage to the control grid can be kept near zero volt because most of the applied alternating current voltage will be dropped across capacitor C1 and resistor R2. With the grid voltage near zero volt, the phase shift that does exist between the voltage applied to the plate and the voltage applied to the control grid will have little effect on the conduction of tube 35. On positive half cycles the grid will draw a small current which must leak through resistor R3 but because of the low voltage applied to the grid, this grid leak current will be so small that it will have little effect on the circuit.

From the foregoing it can be seen that an improved material level detecting device has been provided which will detect the level of solids or liquids and which uses a standard 115 volt alternating current as a source of power. Further the improved material level detection is accomplished by completing a circuit through the material and such circuit may be completed and operable even though the resistance of the material is 200 million ohms or less.

The foregoing disclosure and description of the invention is illustrative and explanatory thereof, and various changes in the size, shape and materials, as well as in the details of the illustrated construction, may be made within the scope of the appended claims without departing from the spirit of the invention.

I claim:
1. A material level detecting device, comprising
   a triode tube,
   a source of alternating current,
   leads connecting the cathode and the plate of said triode tube across the potential of said source,
   a voltage divider circuit connecting across said leads to the grid of said triode tube and including a capacitor and a resistor connected in series to the grid from the plate lead from said source, and a resistor and a capacitor having low capacitive reactance connected in parallel to said grid from the cathode lead from said source,
   a probe,
   a probe circuit connecting said probe to the grid of said triode tube and connecting said probe, when in contact with the material, through ground to the cathode of said triode tube,
   said probe circuit being connected into said voltage divider circuit between said resistor and said capacitor which are connected in series between said plate lead and said grid,
   a diode rectifier connected in series in said probe circuit between said probe and said grid,
   a relay,
   the coil of said relay being connected in series with the lead connecting from said source to said plate of said triode, and
   a capacitor connected in parallel with said relay coil,
   said voltage divider circuit maintaining said grid potential at a low level whereby said tube is conducting during the half cycle of said source which is positive with respect to said plate and said relay is thereby energized,
   said capacitor maintaining said relay energized during the half cycle of said source which is negative with respect to said plate,
   said probe being positioned whereby material reaching the level of said probe completes said probe circuit and current flow in said probe circuit negatively charges said grid preventing conduction by said triode tube and thereby de-energizes said relay.

2. A material level detecting device, comprising
   a triode tube having a cathode, a plate and a grid,
   a source of alternating current,
   leads connecting said cathode and said plate of said triode tube across the potential of said source,
   a voltage divider circuit connecting across said leads to the grid of said triode tube,
   said circuit including a capacitor and a resistor connected in series between the plate lead and said grid, and a resistor and a capacitor having low capacitive reactance connected in parallel between the cathode lead and said grid,
   a material container,
   means connecting said material container to said cathode,
   a probe mounted in said material container,
   a rectified probe circuit connecting said probe to said grid,
   the material in said container when in contact with said probe providing a circuit from said probe through said material and said container to said cathode,
   a relay having a coil,
   said relay coil connected in series with the lead to said plate and being energized when said tube is conducting,
   a capacitor connected in parallel with said relay,
   said voltage divider circuit maintaining said grid potential at a low level whereby said tube is conducting during the half cycle of said source which is positive with respect to said plate and said relay is thereby energized,
   said capacitor maintaining said relay energized during the half cycle of said source which is negative with respect to said plate,
   the completion of said probe circuit charging the plate capacitor in one half cycle of said source and the rectified probe circuit prevents capacitor discharge therethrough whereby the capacitor discharge renders said grid negative and thereby limits flow through said tube.

3. A material level detecting device according to claim 9, wherein
   said rectified probe circuit is completed through material having a resistance of 200 million ohms and any material having a resistance less than 200 million ohms.

4. A material level detecting device according to claim 1 wherein said diode rectifier is connected into said probe circuit to impede the flow of electrons discharging from said series capacitor back through said probe circuit, thus forcing the electrons to impose a negative voltage on the grid of said triode tube.

References Cited by the Examiner

UNITED STATES PATENTS 2,629,826    2/1953    McIlvaine et al.

FOREIGN PATENTS 642,877    9/1950    Great Britain.

MILTON O. HIRSHFIELD, *Primary Examiner.*

L. T. HIX, *Examiner.*